United States Patent
Shimizu

(10) Patent No.: US 8,692,508 B2
(45) Date of Patent: Apr. 8, 2014

(54) BATTERY VOLTAGE MONITORING DEVICE

(75) Inventor: Takumi Shimizu, Yokkaichi (JP)

(73) Assignee: Denso Corporation, Kariya (JP)

( * ) Notice: Subject to any disclaimer, the term of this patent is extended or adjusted under 35 U.S.C. 154(b) by 198 days.

(21) Appl. No.: 13/082,499

(22) Filed: Apr. 8, 2011

(65) Prior Publication Data

US 2011/0248677 A1 Oct. 13, 2011

(30) Foreign Application Priority Data

Apr. 8, 2010 (JP) .................................. 2010-089513

(51) Int. Cl.
*H02J 7/00* (2006.01)

(52) U.S. Cl.
USPC ........................................ 320/103; 320/119

(58) Field of Classification Search
USPC .................. 320/118, 103, 119, 134, 136, 162
See application file for complete search history.

(56) References Cited

U.S. PATENT DOCUMENTS

| | | | |
|---|---|---|---|
| 5,932,932 A | 8/1999 | Agatsuma et al. | |
| 6,538,414 B1 * | 3/2003 | Tsuruga et al. | 320/119 |
| 8,120,322 B2 * | 2/2012 | Lee et al. | 320/118 |
| 8,217,623 B2 * | 7/2012 | Oh et al. | 320/118 |
| 2004/0056639 A1 | 3/2004 | Saigo et al. | |
| 2005/0269988 A1 * | 12/2005 | Thrap | 320/116 |
| 2009/0302803 A1 * | 12/2009 | Oh et al. | 320/118 |
| 2010/0148726 A1 * | 6/2010 | Lee et al. | 320/118 |

FOREIGN PATENT DOCUMENTS

| | | |
|---|---|---|
| JP | 10-084627 | 3/1998 |
| JP | P2004-120871 A | 4/2004 |
| JP | 2007-006552 | 1/2007 |
| JP | 2007-012407 | 1/2007 |

OTHER PUBLICATIONS

Japanese Office Action dated Apr. 10, 2012, issued in corresponding Japanese Application No. 2010-089513 with English Translation.

* cited by examiner

*Primary Examiner* — Edward Tso
*Assistant Examiner* — Aaron Piggush
(74) *Attorney, Agent, or Firm* — Nixon & Vanderhye P.C.

(57) ABSTRACT

A battery voltage monitoring device for efficiently equalizing cell voltages of a plurality of battery cells connected in series through a direct charge transfer between mutually distant battery cells. The device includes a charge-transfer circuit configured to perform a direct charge transfer from a first battery cell to a second battery cell that is fifth or higher adjacent to the first battery cell. This can eliminate charge-transfer losses that would occur during sequential charge transfers between adjacent battery cells, which leads to an efficient charge transfer between mutually distant battery cells.

11 Claims, 5 Drawing Sheets

BATTERY VOLTAGE MONITORING DEVICE

CROSS-REFERENCE TO RELATED APPLICATION

This application is based on and claims the benefit of priority from earlier Japanese Patent Application No. 2010-89513 filed Apr. 8, 2010, the description of which is incorporated herein by reference.

BACKGROUND

1. Technical field of the Invention

This invention relates to a battery voltage monitoring device for equalizing cell voltages of a plurality of battery cells connected in series.

2. Related Art

There is conventionally known a voltage equalization device for equalizing cell voltages (or terminal voltages) of a plurality of battery cells (or electricity storage elements) connected in series to form a battery pack. Japanese Patent Application Publication No. 2007-12407 discloses such a voltage equalization device. Specifically, the disclosed voltage equalization device comprises a transformer including: a primary winding, one end of the primary winding being connected to a negative terminal of the battery pack via a switch and the other end of the primary winding being connected to a positive terminal of the battery pack; a plurality of secondary windings one-to-one corresponding to the plurality of battery cells; and an energy storage section (an air gap) formed by utilizing an iron core.

In the above disclosed voltage equalization device, when the switch is turned on, a primary current flows through the primary winding of the transformer and then magnetic energy is stored in the energy storage section. Upon turn-off of the switch, the stored magnetic energy is released from the energy storage section in a form of secondary currents flowing through the respective secondary windings as a function of the cell voltages of the corresponding battery cells, thereby charging the respective battery cells. A larger secondary current flows into a battery cell having a lower cell voltage. That is, the cell voltages of the plurality of battery cells can be equalized among the battery cells sharing the primary winding of the transformer by repeatedly turning on and off the switch.

However, in an electrical vehicle (EV) or the like which has a number of battery cells connected in series to form a battery pack, there exists a disadvantage that an overall circuit size becomes larger with an increasing number of battery cells. To reduce the circuit size, the battery cells connected in series may be grouped into a plurality of blocks to make a voltage across each block lowered. However, a plurality of energy losses or heat conversion losses may occur due to repetitive turning on/off of the switch during a charge transferring process between different blocks, which may lead to significant reduction of charge transfer efficiency. Therefore, when a charge transferring process is performed between mutually distant battery cells with a predetermined number or more of intermediate battery cells therebetween, the process is accompanied by many times of turning-on/off of the switch, which may make the charge transferring process between mutually distant battery cells inefficient.

In the above, the voltage equalization device of transformer type has been explained. A charge-pump-type voltage equalization device and a flyback-type voltage equalization device have a similar disadvantage. In the charge-pump type voltage equalization device, a voltage equalization process is performed through charge transfers between adjacent battery cells within one block or a predetermined number of battery cells and charge transfers between different blocks. However, a charge transfer from one battery cell in one block to another battery cell in another block is accompanied by many times of turning on/off of the switch(es), which leads to reduction of charge transfer efficiency. On the other hand, in the flyback-type voltage equalization device, the voltage equalization is accompanied by sequential charge transfers between adjacent battery cells. Therefore, in the flyback-type voltage equalization device, transferred charge is likely to be eliminated during the sequential charge transfers from one end to the other end of the battery pack or battery block due to the energy losses or heat conversion losses that may occur upon turn on/off of the switch(es).

In consideration of the foregoing, exemplary embodiments of the present invention are directed to providing a battery voltage monitoring device for equalizing cell voltages of a plurality of battery cells connected in series to form a battery pack, which can perform an efficient charge transfer from one battery cell to another battery cell that is distant from the first battery cell while suppressing increase in circuit size of the device.

SUMMARY

In accordance with an exemplary aspect of the present invention, there is provided a battery voltage monitoring device for equalizing cell voltages of a plurality of battery cells connected in series. The device comprises cell-voltage detecting means for detecting cell voltages of the plurality of battery cells and charge-transferring means for performing a direct charge transfer from a first battery cell to a second battery cell that is second or higher adjacent to the first battery cell (or is located two or more battery cells away from the first battery cell, which means that there exist one or more battery cells between the first and second batter cells) and has a lower cell voltage than the first battery cell on the basis of the cell voltages of the battery cells detected by the cell-voltage detecting means.

The direct charge transfer from the first battery cell to the second battery cell that is second or higher adjacent to the first battery cell can eliminate a charge-transfer loss, such as an energy loss and a heat dissipation or conversion loss, that would occur during subsequent charge transfers between adjacent battery cells from the first battery cell to the second battery cell. A conventional charge transfer from a first battery cell to a second battery cell that is second or higher adjacent to the first battery cell includes two or more sequential charge transfers between adjacent battery cells. In contrast, according to this aspect of the present invention, a charge transferring process achieved by the above conventional, sequential charge transfers from the first battery cell to the second battery cell can be achieved by only one direct charge transfer from the first battery cell to the second battery cell. Since only the charge-transferring means is required, increase in circuit size can be significantly suppressed. Therefore, this provides a more efficient charge transfer from one battery cell to another battery cell that is second or higher adjacent to the one battery cell, and leads to significant suppression of increase of increase in circuit size.

DESCRIPTION OF SPECIFIC EMBODIMENTS

The present inventions will be described more fully hereinafter with reference to the accompanying drawings. Like is numbers refer to like elements throughout.

(First Embodiment)

Figure 1:
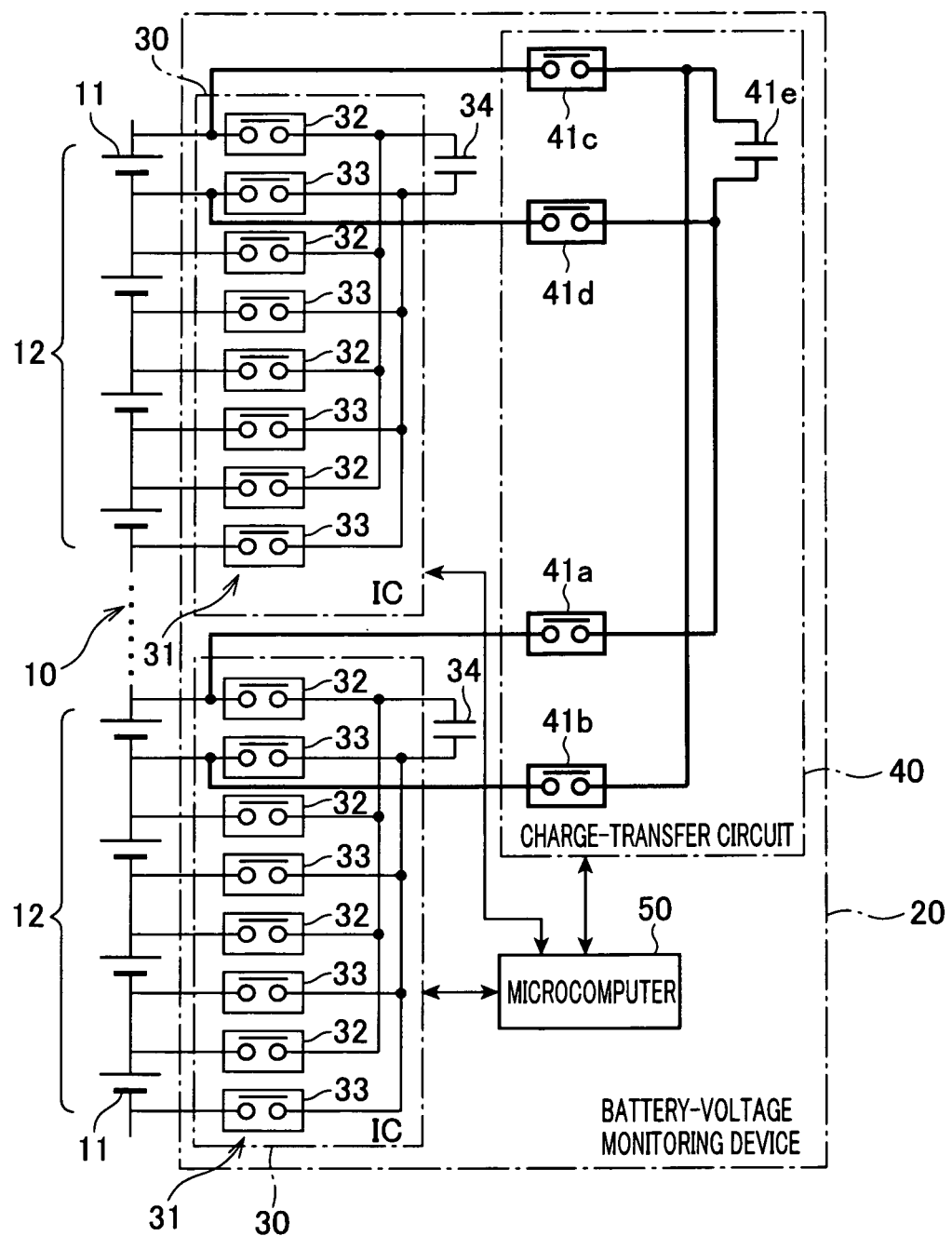
FIG. 1 is a block diagram of a battery voltage monitoring system including a battery voltage monitoring device in accordance with a first embodiment of the present invention.

FIG. 1 schematically illustrates a block diagram of a battery voltage monitoring system including a battery voltage monitoring device in accordance with a first embodiment of the present invention. As shown in FIG. 1, the battery voltage monitoring system includes a battery pack 10 and a battery voltage monitoring device 20.

The battery pack 10 includes a plurality of battery cells 11 connected in series (each cell being an elementary battery unit), which are grouped into a plurality of blocks of battery cells such that the blocks are connected in series and each include a same predetermined number of battery cells connected in series (e.g., in the present embodiment, each block has four battery cells connected in series). For example, more than one hundred battery cells 11 connected in series to form a battery pack may be rechargeable lithium-ion secondary batteries. The battery pack 10 may be mounted in an electrical vehicle such as a hybrid car, and may be used for a power source to drive an electrical load, such as an inverter or a motor, or for a power source to drive an electronic device. Accordingly, the battery voltage monitoring device 20 may also be used in an electrical vehicle such as a hybrid car. For illustrative purposes, FIG. 1 shows only two blocks 12, while the battery pack 10 may actually include two or more blocks.

The battery voltage monitoring device 20 is operative to detect, for example, a remaining capacity or State of Charge (SOC) of the battery pack 10 and/or over-discharge and over-charge for each battery cell 11 as a secondary battery.

The remaining capacity (SOC) of the battery pack 10 can be derived from a voltage across the battery pack 10 or a current that flows through the battery pack 10. The over-discharge and over-charge can be detected by monitoring cell voltages of the is battery cells 11 and comparing the cell voltage of each battery cell 11 with a predetermined threshold. When the battery cells 11 are each a secondary battery, the battery voltage monitoring device 20 is operative to detect whether or not the cell voltage of each battery cell 11 is in a predetermined range between a threshold for over-charge and a threshold for over-discharge.

For this purpose, the battery voltage monitoring device 20 includes a plurality of monitoring ICs 30, a charge-transfer circuit 40, and a microcomputer 50.

The plurality of monitoring ICs 30 are respectively associated with the plurality of blocks 12. Each monitoring IC 30 detects a cell voltage of each battery cell 11 in the associated block 12, detects an electrical current that flows through each battery cell 11 in the associated block 12, and equalizes the cell voltages of the battery cells 11 within the associated block 12, in accordance with instructions outputted from the microcomputer 50.

Each monitoring IC 30 is connected to the battery cells 11 in the associated block 12 with each battery cell being connected to the monitoring IC 30 through a pair of wirings connected to positive and negative terminals of the battery cell respectively. In this configuration, since for each block 12 the battery cells 11 are connected in series, a positive terminal of each battery cell (except a battery cell on the highest voltage side) is connected to a negative terminal of its adjacent battery cell through a wiring.

There is provided in each monitoring IC 30 a cell-voltage detection circuit (not shown) for detecting cell voltages of the battery cells 11 in the associated block 12 where the cell-voltage detection circuit can be connected to each battery cell with the pair of wirings. The cell-voltage detection circuit includes, for example, a comparator, a differential amplifier, and an A/D converter. A conventional flying capacitor type voltage detection circuit may be used as the cell-voltage detection circuit. Data about detected cell voltages of the battery cells 11 are to be sequentially outputted to the microcomputer 50.

Each monitoring IC 30 further includes a cell-voltage equalization circuit 31 for equalizing cell voltages of the battery cells 11 in the associated block 12. The cell-voltage equalization circuit 31 comprises switches 32, 33 and a capacitor 34, and is operative to perform a charge transfer between adjacent battery cells 11 within the block 12 (hereinafter, also referred to as an intra-block charge transfer). Of the switches 32, 33, one pair of switches 32, 33 are provided for each battery cell 11.

For each pair of switches 32, 33, one end of the switch 32 is connected to the positive terminal of the corresponding battery cell 11, and one end of the switch 33 is connected to the negative terminal of the corresponding battery cell 11. The other end of the switch 32 connected to the positive terminal of the corresponding battery cell is connected to one electrode of the capacitor 34, and the other end of the switch 33 connected to the negative terminal of the corresponding battery cell 11 is connected to the other electrode of the capacitor 34. That is, the capacitor 34 is connected in parallel to the battery cells 11 in the corresponding block 12 via respective pairs of switches 32, 33. The cell-voltage equalization circuit 31 of the present embodiment has the charge-pump type configuration in which the cell voltage is to be increased by turning on and off the switches 32, 33.

Each switch 32, 33 is On-OFF controlled by the microcomputer 50. A semiconductor switch such as a transistor may be used as the switch 32, 33. As shown in FIG. 1, each capacitor 34 may be provided outside the monitoring IC 30.

The charge-transfer circuit 40 is configured to perform a direct charge transfer from a first battery cell 11 to a second battery cell 11 that is fifth or higher adjacent to the first battery cell (or is located five or more battery cells away from the first battery cell, which means that there exist four or more battery cells between the first and second battery cells). More specifically, the charge-transfer circuit 40 performs a direct charge transfer from a first battery cell 11 in a first block 12 to a second battery cell 11 in a second block 12 that is different from the first block 12. That is, the charge-transfer circuit 40 performs a direct charge transfer between mutually distant battery cells that are in different blocks 12. In other words, the charge-transfer circuit 40 implements bypassing means for most efficiently transferring electric charge from one battery cell 11 at a higher charge level to another battery cell 11 at a lower charge level.

The charge-transfer circuit 40 of the present embodiment includes a first pair of switches 41a, 41b associated with a first block 12, a second pair of switches 41c, 41d associated with a second block 12, and a capacitor 41e.

One end of the switch 41a associated with the first block 12 is connected to the positive terminal of the battery cell 11 on the highest voltage side in the first block 12. More specifically, one end of the switch 41a is connected to the wiring between the positive terminal of the battery cell 11 on the highest voltage side in the First block 12 and the switch 32. On the other hand, one end of the switch 41b associated with the first block 12 is connected to the negative terminal of the battery cell 11 on the highest voltage side in the first block 12. More specifically, one end of the switch 41b is connected to the wiring between the negative terminal of the battery cell 11 on the highest voltage side in the first block 12 and the switch 33.

One end of the switch 41c associated with the second block 12 is connected to the positive terminal of the battery cell 11 on the highest voltage side in the second block 12. More specifically, one end of the switch 41c is connected to the wiring between the positive terminal of the battery cell 11 on the highest voltage side in the second block 12 and the switch 32. One end of the switch 41d associated with the second block 12 is connected to the negative terminal of the battery cell 11 on the highest voltage side in the second block 12. More specifically, one end of the switch 41d is connected to the wiring between the negative terminal of the battery cell 11 on the highest voltage side in the second block 12 and the switch 33.

On the other hand, the other end of the switch 41a associated with the first block 12 and the other end of the switch 41d associated with the second block 12 are both connected to one electrode of the capacitor 41e. The other end of the switch 41b associated with the first block 12 and the other end of the switch 41c are both connected to the other electrode of the capacitor 41e. Also, the charge-transfer circuit 40 has the charge-pump configuration.

The switches 41a-41d are used to switch between a charge-transfer-enabled mode and a charge-transfer-inhibited mode of the charge-transfer circuit 40. In the charge-transfer-enabled mode electric charge is allowed to be transferred from the first battery cell to the second battery cell by turning on or off each of the switches, and in the charge-transfer-inhibited mode electric charge is not allowed to be transferred from the first battery cell to the second battery cell by keeping the switches turned off. The switches 41a-41d are directly ON-OFF controlled by the microcomputer 50 to perform the charge transfers. An optical insulating element such as a photo MOS relay may be used as each switch 41a-41d. Alternatively, the microcomputer 50 may indirectly control each switch 41a-41d via the monitoring ICs 30.

FIG. 1 shows the charge-transfer circuit 40 being connected to only two blocks 12. Actually, the capacitor 41e is connected to one battery cell 11 in each block 12 (in the present embodiment, the battery cell on the highest voltage side in each block 12) via the two switches associated with the block 12.

The microcomputer 50 may include a CPU (not shown), a ROM (not shown), an EEPROM (not shown), a RAM (not shown), and may implement the above functions in accordance with programs stored in the ROM or the like. The microcomputer 50 outputs to each monitoring IC 30 an instruction signal to instruct the monitoring IC 30 to perform a desired process, such as a cell-voltage detecting process to detect the cell voltages of the battery cells in the corresponding block 12. The microcomputer 50 then acquires data from each monitoring IC 30 to estimate a remaining capacity (SOC) of the battery pack (to monitor a state of the battery pack) and detect over-discharge and over-charge conditions for each battery cell.

Specifically, the microcomputer 50 is operative to equalize the cell voltages of the plurality of battery cells 11 by performing charge transfers via the cell-voltage equalization circuits 31 for the respective monitoring ICs 30 and the charge-transfer circuit 40. To equalize the cell voltages, the microcomputer 50 controls the cell-voltage equalization circuits 31 and the charge-transfer circuit 4Q to minimize a number of charge transfers on the basis of the detected cell voltages of the battery cells 11. That is, the microcomputer 50 estimates a heat dissipation loss which will occur during each charge transfer, and determine the most efficient sequence of charge transfers, i.e., an optimal path with a minimum number of charge transfers.

In the above, the overall configuration of the battery voltage monitoring system including the battery voltage monitoring device 20 has been explained.

There will now be explained a cell-voltage equalizing process for equalizing the cell voltages of the plurality of battery cells 11 to be performed by the battery voltage monitoring device 20 of the is present embodiment with reference to FIG. 2. The cell-voltage equalizing process starts with, for example, the microcomputer 50 outputting a start instruction signal to a monitoring IC 30 for instructing the monitoring IC 30 to start the cell-voltage equalizing process.

Upon receipt of the start instruction signal from the microcomputer 50, the monitoring IC 30 detects the cell voltages of the battery cells 11 in the associated block 12 via the cell-voltage detection circuit of the monitoring IC 30.

The microcomputer 50 determines which battery cell should be discharged because of its relatively high cell voltage among the battery cells in the block on the basis of a variation in cell voltage among the battery cells in the block acquired from the monitoring IC 30. The microcomputer 50 then outputs to the monitoring IC 30 an instruction signal to instruct the monitoring IC 30 to equalize so the cell voltages of the battery cells 11 in the block 12.

The charge transfer within the block 12 will be performed as follows. The monitoring IC 30 activates the cell-voltage equalization circuit 31 upon reception of the instruction signal for cell-voltage equalization from the microcomputer 50. That is, the monitoring IC 30 turns on the switches 32, 33 connected to both terminals of a first battery cell that is the battery cell to be discharged, and then turns off the other switches 32, 33 whereby electric charge discharged from the first battery cell 11 will be stored in the capacitor 34 in the cell-voltage equalization circuit 31.

Subsequently, the monitoring IC 30 turns on the switches 32, 33 associated with a second battery cell that has a relatively low voltage in the block 12, and then turns of the other switches 32, 33 whereby the electric charge stored in the capacitor 34 will be transferred to the second battery cell 11.

In this way, the charge transferring process within one block 12 can be performed via the capacitor 34 in the cell-voltage equalization circuit 31. When the block 12 consists of four battery cells 11, the cell voltages of the battery cells 11 within the block 12 can be equalized through either one of the charge transfer from one battery cell to another battery cell adjacent to the one battery cell, the charge transfer from one battery cell to another battery cell second adjacent to the one battery cell, and the charge transfer from one battery cell to another battery cell third adjacent to the one battery cell.

The charge transfer between two different battery cells that reside in different blocks 12 will be performed as follows. In the following. It can be assumed that, as a result of the cell-voltage detection in each monitoring IC 30 in response to the start instruction signal outputted from the microcomputer 50, a first battery cell 11 in a first block 12 of the plurality of blocks has a relatively high cell voltage, and a second battery cell 11 in a second block 12 that is different from the first block 12 has a relatively low cell voltage.

Figure 2A:
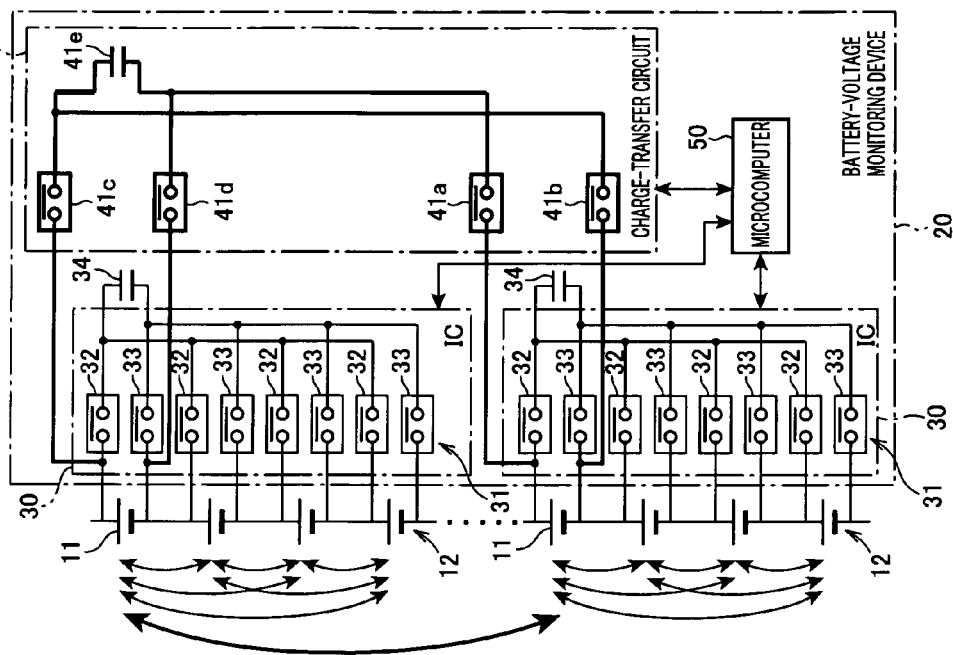
FIG. 2A schematically illustrates a specific cell-voltage equalizing process of the battery voltage monitoring device where a so minimum number of charge transfers is three.

Specifically, as shown in FIG. 2A, it can be assumed that the first block 12 is on a lower voltage side, and the second block is on a higher voltage side. The first battery cell 11, which is denoted by "HIGH", is first adjacent to the battery cell on the highest voltage side within the first block 12. On the other hand, the second battery cell 11, which is denoted by "LOW", is second adjacent to the battery cell on the highest voltage side within the second block 12. In such a case, the cell-voltage equalization of the present invention can be achieved through an inter-block charge transferring process between the first and second blocks.

The microcomputer 50 attempts to search for an optimal charge-transfer path along which a minimum number of charge transfers are to be performed. That is, the microcomputer 50 determines which charge transfer path is possible with the smallest heat dissipation loss during the charge transferring process along the path. For example, the microcomputer 50 determines the optimal charge-transfer path by estimating a number of intra-block charge transfers to be performed by the cell-voltage equalization circuits 31 and a number of inter-block charge transfers to be performed by the charge-transfer circuit 40 for each possible charge-transfer path, comparing total numbers of charge transfers for the possible charge-transfer paths where each total number of charge transfers is given by a sum of the number of intra-block charge transfers and the number of inter-block charge transfers, and then determining a charge transfer path with the smallest total number of charge transfers. In the scenario as shown in FIG. 2A, the minimum total number of charge transfers is three.

As described above, through the operation of the cell-voltage equalization circuit 31 associated with the first block 12, the charge transfer is performed from the first battery cell 11, so which is a battery cell with a relatively high cell voltage in the first block 12, to the capacitor 34 of the cell-voltage equalization circuit 31. Subsequently, the electric charge stored in the capacitor 34 is transferred to the battery cell on the highest voltage side in the first block 12 through the monitoring IC 30 associated with the first block 12 turning on the switches 32, 33 that are connected to the switches 41a, 41b in the charge-transfer circuit 40, respectively. Through the charge transferring operation denoted by the bidirectional arrow (1) in FIG. 2A, the electric charge is transferred from the first battery cell 11, i.e, the battery cell 11 adjacent to the battery cell on the highest voltage side in the first block 12, to the battery cell on the highest voltage side in the first block 12. The charge-transfer path (1) in FIG. 2A accounts for one charge transfer.

Subsequently, the charge-transfer circuit 40 turns on the switches 41a, 41b with the other switches 32, 33 being turned off. This leads to a charge transfer from the battery cell on the highest voltage side in the first block 12 to the capacitor 41e in the charge-transfer circuit 40. The electric charge stored in the capacitor 41e is then transferred to the battery cell on the highest voltage side in the second block 12 through the charge-transfer circuit 40 turning on the switches 41c, 41d that are connected to the switches 32, 33 associated with the battery cell 11 on the highest voltage side in the second block 12, respectively. Through the charge transferring operation denoted by the bidirectional arrow (2) in FIG. 2A, the electric charge discharged from the first battery cell 11 in the first block 12 is transferred from the battery cell 11 on the highest voltage side in the first block 12 to the battery cell 11 on the highest voltage side in the second block 12.

Then, as described above, the monitoring IC 30 associated with the second block 12 turns on the switches 32, 33 associated with the battery cell on the highest voltage side in the second block 12 with the other switches 41c, 41d being turned off. This leads to a charge transfer from the battery cell 11 on the highest voltage side in the second block 12 to the capacitor 34 in the cell-voltage equalization circuit 31 of the monitoring IC 30 associated with the second block 12. Subsequently, the electric charge stored in the capacitor 34 is transferred to the second battery cell 11 through the monitoring IC 30 associated with the second block 12 turning on the switches 32, 33 associated with the second battery cell 11 with the other switches 32, 33 being turned off. Through the charge transferring operation denoted by the bidirectional arrow (3) in FIG. 2A, the electric charge discharged from the first battery cell 11 is transferred from the battery cell 11 on the highest voltage side in the second block 12 to the second battery cell 11.

In this way, electric charge can be efficiently transferred from one battery cell 11 with a relatively high cell-voltage in one block 12 to another battery cell 11 with a relatively low cell-voltage in another block 12 through the three-step charge-transferring process:(1)→(2)→(3) as shown in FIG. 2A. That is, in the present embodiment as shown in FIG. 2A, the cell-voltage equalization can be achieved with a minimum number of charger transfers, i.e., three charge transfers.

Figure 2B:
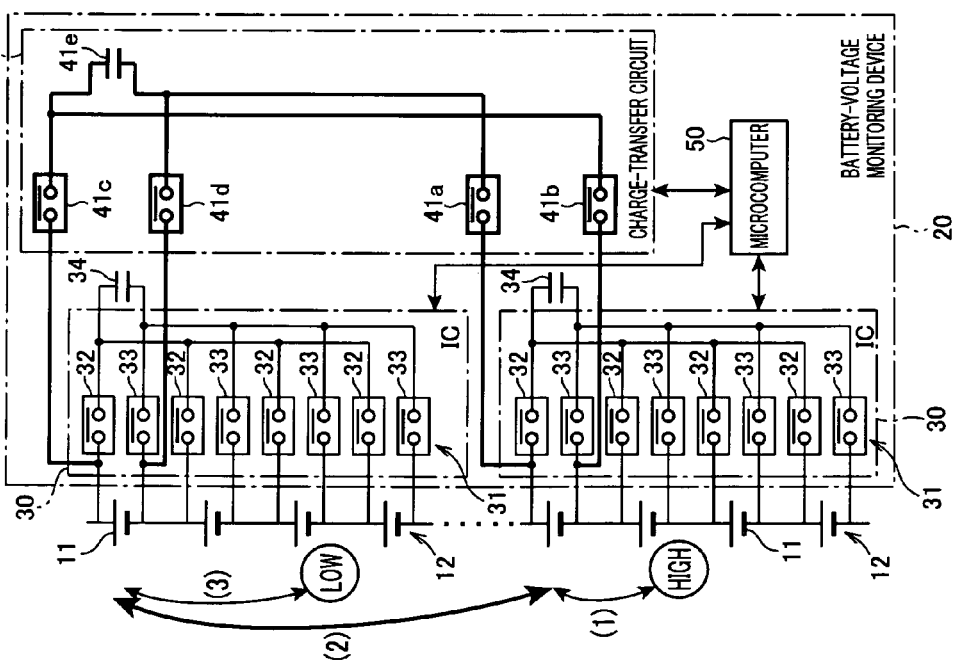
FIG. 2B schematically illustrates possible charge transfers to be performed in an actual cell-voltage equalizing process of the battery voltage monitoring device.

As described above, the intra-block charge transfer through the cell-voltage equalization circuit 31 and the inter-block charge transfer through the charge-transfer circuit 40 are both available. Therefore, as shown in FIG. 2B, some charge-transfer paths may include not only a direct path for an intra-block charge transfer from one battery cell to another battery cell within one block 12, but also a direct path for an inter-block charge transfer from one battery cell in one block to another battery cell in another block, e.g., in the present embodiment, from the battery cell on the highest voltage side in one block to the battery cell on the highest voltage side in another block. The microcomputer 50 can achieve the most efficient cell-voltage equalization along the optimal charge-transfer path that may include the inter-block charge transfer path(s).

In the above, the charge transferring process from the first battery cell in the first block to the second battery cell in the second block has been explained. An inverse charge transferring process from the second battery cell in the second block to the first battery cell in the first block is also possible to be performed in a similar way.

As described above, the battery voltage monitoring device 20 of the present embodiment is characterized in that electric charge may be directly transferred from one battery cell in one block to another battery cell in another block through the charge-transfer circuit 40.

With this configuration, electric charge may be directly transferred from one battery cell 11 to another battery cell 11 that is distant from the one battery cell 11 through the charge-transfer circuit 40 without performing sequential charge transfers between adjacent battery cells, which can suppress or eliminate the charge transfer losses, such as the energy or heat conversion loss, that would occur during the sequential charge transfers. That is, significantly efficient cell-voltage equalization can be achieved through a smaller number of charge transfers as compared with the conventional techniques. Therefore, an efficient charge transfer from one battery cell 11 to another battery cell 11 that is distant from the one battery cell with a number of intermediate battery cells therebetween can be achieved.

That is, in the present embodiment, instead of performing sequential charge transfers between adjacent battery cells, a direct charge transfer may be performed from a first battery cell 11 to a second battery cell fifth or higher adjacent to the first battery cell 11 through the charge-transfer circuit 40 bypassing the battery so cells between the first and second battery cells. Such a charge transfer has the following advantage in efficiency.

For example, it may be supposed that a charge-transfer efficiency is 90%, i.e., for each charge transfer between adjacent battery cells 10% of discharged electric charge will be lost in a form of heat or the like. With this efficiency, 90% of electric charge discharged from a first battery cell will be transferred to a second battery cell adjacent to the first battery cell. Subsequently, 81% of electric charge discharged from the first battery cell will be transferred to a third battery cell adjacent to the second battery cell, i.e., a battery cell second adjacent to the first battery cell.

In this way, electric charge discharged from the first battery cell 11 will be gradually reduced each time the charge transfer between adjacent battery cells is performed. More specifically, 72.9% of the electric charge discharged from the first battery cell 11 will be transferred to a fourth battery cell 11 third adjacent to the first battery cell, and then 65.6% of the electric charge discharged from the first battery cell 11 will be transferred to a fifth battery cell fourth adjacent to the first battery cell. Subsequently, only 59% of the electric charge discharged from the first battery cell 11 will be transferred to a sixth battery cell 11 fifth adjacent to the first battery cell. Consequently, 40% or more of the electric charge discharged from the first battery cell 11 will be lost after the charge transfer from the fifth battery cell 11 to the sixth battery cell 11, which leads to a chain of charge-transfer losses.

In the present embodiment, however, since a direct charge transfer may be performed from a first battery cell 11 to a second battery cell 11 that is distant from the first battery cell 11 through the charge-transfer circuit 40 bypassing intermediate battery cells between the first and second battery cells, electric charge can be transferred from the first battery cell 11 to the second battery cell 11 that may be fifth or sixth or higher adjacent to the first battery cell 11 via only one charge transfer with efficiency of 90%. That is, the more distant the second battery cell 11 is, the more efficient the charge transfer becomes.

In particular, in an electrical vehicle such as a hybrid car, a battery pack 10 may be composed of hundreds of battery cells. Therefore, a charge transfer from a battery cell 11 at one end of the battery pack 10 to a distant battery cell 11 at the other end of the battery pack can be advantageously performed by the charge-transfer circuit 40 bypassing intermediate battery cells between the battery cells at both ends of the battery pack 10.

It should be noted that temperatures of the battery cells 11 in the battery pack 10 may vary with their locations within the battery pack. For example, the battery cell 11 in the center of the battery pack 10 has a temperature higher than temperatures of the battery cells 11 at both ends of the battery pack 10. Accordingly, the cell voltage of the battery cell in the center is lowered relative to the cell voltages of the battery cells at both ends, and thus the remaining capacity SOC of the battery cell 11 in the center of the battery pack 10 will be reduced. On the other hand, temperatures of adjacent battery cells 11 are substantially same regardless of their locations in the battery pack 10.

In the above, in the present embodiment, electric charge can be efficiently transferred from a first battery cell 11 at either one of ends of the battery pack 10 to a second battery cell 11 in the center of the battery pack 10 through the charge-transfer circuit 40 bypassing intermediate battery cells between the first and second battery cells 11. That is, electric charge can be efficiently transferred from a first battery cell 11 at one end of the battery pack 10 to a second battery cell 11 in the center of the battery pack 10 that is distant from the first battery cell without performing inefficient, sequential charge transfers between adjacent battery cells 11.

In addition, since the microcomputer 50 is configured to perform a minimum total number of charge transfers, the heat dissipation loss that may occur in the cell-voltage equalization circuit 31 and the charge-transfer circuit 40 as a function of a total number of charge transfers will be minimized. This can lead to the most efficient charge transferring process.

It is only the charge-transfer circuit 40 that has to be added to the monitoring IC 30 to perform the inter-block charge transfers, which can suppress increase in circuit size. Accordingly, it is possible to suppress increase in circuit size and implement an efficient charge transferring process from one battery cell 11 to another battery cell 11 that is fifth or higher adjacent to the one battery cell 11.

(Second Embodiment)

There will now be explained the second embodiment of the present invention. For brevity, only differences from the first embodiment will be explained.

In the second embodiment, a block-voltage-based charge transfer between different blocks 12 may be included in the charge transferring process, while in the first embodiment, as described above, only the cell-voltage-based charge transfers between different battery cells 11 are included in the charge transferring process.

Figure 3:
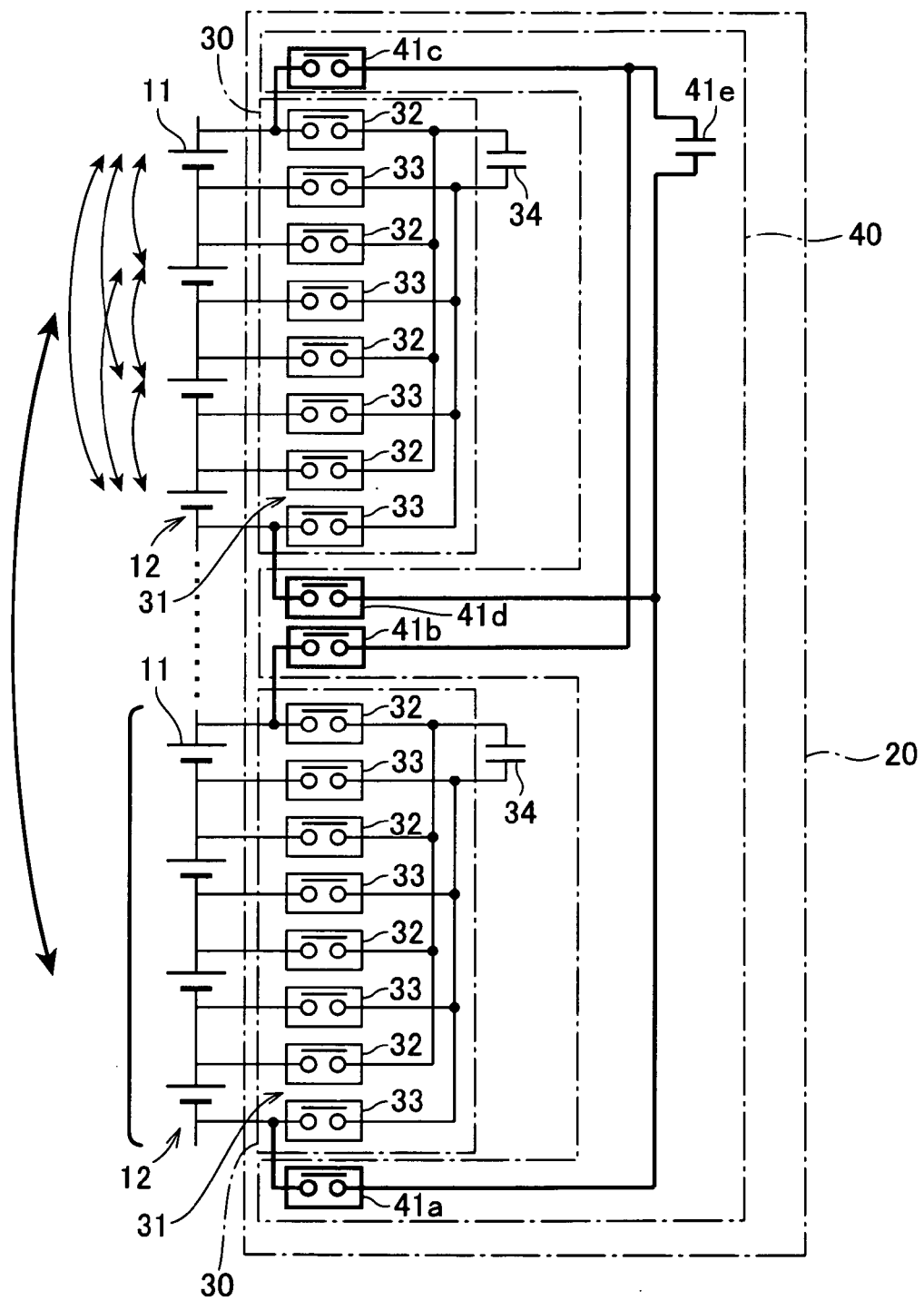
FIG. 3 is a block diagram of a battery voltage monitoring system including a battery voltage monitoring device in accordance with a second embodiment of the present invention.

FIG. 3 is a block diagram of a battery voltage monitoring system including a battery voltage monitoring device in accordance with the second embodiment of the present invention. For simplicity, the microcomputer 50 is not shown in FIG. 3.

As shown in FIG. 3, the charge-transfer circuit 40 of the present embodiment is configured to perform a direct charge transfer from a first block 12 to a second block 12 that is different from the first block 12 where an amount of electric charge to be discharge from the first block 12 depends on a block voltage across the first block 12.

Specifically, one end of the switch 41a associated with the first block 12 is connected to a negative terminal of the battery cell 11 on the lowest voltage side in the first block 12. One end of the switch 41b associated with the first block 12 is connected to a positive terminal of the battery cell 11 on the highest voltage side in the first block 12. When the switch 41a and the switch 41b are both turned on by the microcomputer 50, the first block 12 will be connected to the capacitor 41e.

On the other hand, one end of the switch 41c associated with the second block 12 is connected to a positive terminal of the battery cell 11 on the highest voltage side in the second block 12. One end of the switch 41d is connected to a negative terminal of the battery cell 11 on the lowest voltage side in the second block 12. When the switch 41c and the switch 41d are both turned on by the microcomputer 50, the second block 12 will be connected to the capacitor 41e.

In the charge-transfer circuit 40 of such configuration, the microcomputer 50 turning on the switches 41a, 41b connected to the first block 12 allows electric charge to be transferred to the capacitor 41e as a function of the block voltage of the first block 12. The microcomputer 50 subsequently turns on the switches 41c, 41d (with the switches 41a, 41b being turned off) in the charge-transfer circuit 40, which allows the electric charge stored in the capacitor 41e to be transferred to the second block 12. That is, in the present embodiment, electric charge for one block, i.e., the first block 12, can be transferred from the first block 12 to the second block 12 via only one charge transfer.

After the direct charge transfer from the first block 12 to the second block 12, the electric charge discharged from the first block 12 is allowed to be allocated or distributed to the individual battery cells 11 within the second block 12 depending on their respective cell-voltages.

As described above, in the present embodiment, the block-voltage-based charge transfer may be included in the voltage equalization process. One block-voltage-based charge transfer from one block 12 to another block 12 allows a larger amount of electric charge to be transferred as compared with one cell-voltage-based charge transfer (i.e., one charge transfer from one battery cell to another battery cell), which leads to a more efficient charge transferring process, and thus to a more efficient voltage equalizing process.

Since in the present embodiment the block-voltage-based charge transfer may be included in the charge transferring process, each monitoring IC 30 may be configured to directly detect a block voltage of its associated block 12. Subsequently, the microcomputer 50 may compare the detected block voltages of the respective blocks, and may then transfer electric charge from one block 12 that has a relatively high block voltage among the blocks 12 to another block 12 that has a relatively low block voltage among the blocks 12.

(Third Embodiment)

There will now be explained the third embodiment of the present invention. For brevity, only differences from the first and second embodiments will be explained.

In the third embodiment the cell-voltage equalizing process may be performed through flyback-type charge transfers, while in the first and second embodiments the cell-voltage equalizing process is performed through the charge-pump-type charge transfers.

Figure 4:
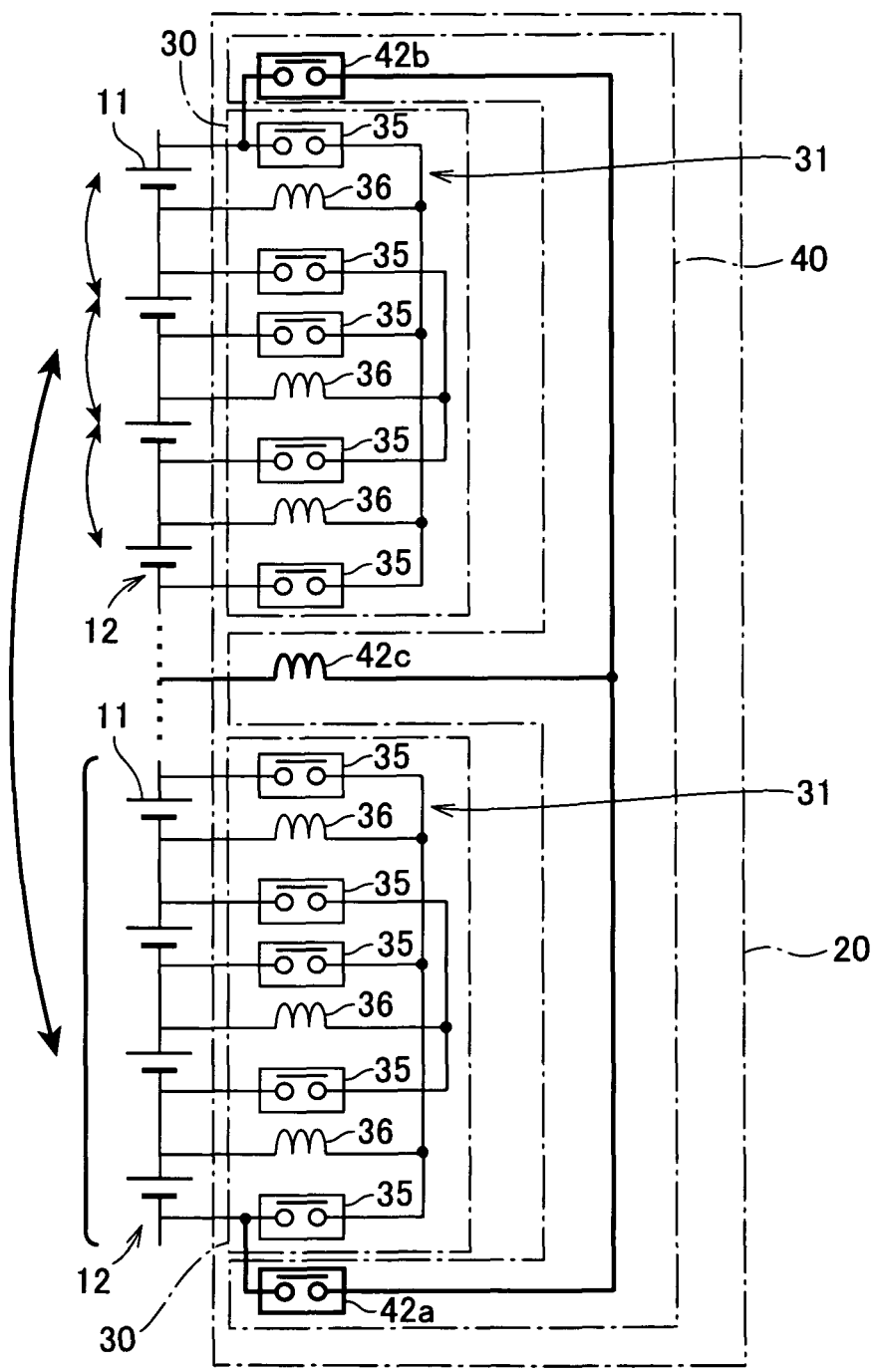
FIG. 4 is a block diagram of a battery voltage monitoring system including a battery voltage monitoring device in accordance with a third embodiment of the present invention.

FIG. 4 is a block diagram of a battery voltage monitoring system including a battery voltage monitoring device in accordance with the third embodiment of the present invention. For simplicity, the microcomputer 50 is not shown in FIG. 4.

As shown in FIG. 4, also in the present embodiment, each monitoring IC 30 includes a cell-voltage equalization circuit 31 for the battery cells 11 within the associated block 12. In the present embodiment, however, each cell-voltage equalization circuit 31 is of flyback type.

Specifically, each cell-voltage equalization circuit 31 includes a plurality of switches 35 and a plurality of coils 36. There is provided for each battery cell 11 a loop circuit composed of the battery cell 11 and one of the switches 35 and one of the coils 36. In one of such loop circuits associated with a first battery cell 11 to be discharged because of its relatively high cell voltage among the plurality of battery cells, the microcomputer 50 turns on the switch 35 in the loop circuit, which allows a discharging current from the first battery cell 11 to flow through the coil 36 in the loop circuit, thereby leading to magnetic energy being stored in the coil 36. Subsequently, the magnetic energy stored in the coil 36 is released in a form of an electrical current flowing into a second battery cell 11 that is adjacent to the first battery cell 11 through the microcomputer 50 turning on the switch 35 in a loop circuit associated with the second battery cell 11 with the other switches 35 being turned off, which leads to a flyback-type charge transfer from the first battery cell 11 to the second battery cell.

The charge-transfer circuit 40, which is also of flyback type, includes the switch 42a, the switch 42b, and the coil 42c. In addition, the charge-transfer circuit 40 is configured to perform a block-voltage-based charge transfer between different blocks 12.

In the charge-transfer circuit 40, one end of the switch 42a is connected to a negative terminal of a first battery cell that is on the lowest voltage side in a first block 12. One end of the switch 42b is connected to a positive terminal of a second battery cell 11 that is on the on the highest voltage side in a second block 12. One end of the coil 42c is connected to a positive terminal of a third battery cell 11 that is on the highest voltage side in the first block 12. The other end of the coil 42 is connected to the other end of the switch 42a and the other end of the switch 42b. The second block is on a higher voltage side than the first block among the blocks 12.

The first block 12, the coil 42c, and the switch 42a form a first loop circuit. The second block 12, the switch 42b, and the coil 42c form a second loop circuit.

In such a charge-transfer circuit 40, the microcomputer 50 turns on, for example, the switch 42a connected to the first block 12, which allows an electrical current from the first block 12 to flow through the coil 42c in the first loop circuit, thereby leading to magnetic energy being stored in the coil 42c.

Subsequently, the microcomputer 50 turns on the switch 42b connected to the second block 12, which allows the magnetic energy stored in the coil 42c to be released in a form of an electric current flowing through the second loop circuit, thereby leading to a block-voltage-based charge transfer from the first block 12 to the second block 12. The transferred charge from the first block 12 to the second block will then be allocated or distributed to the battery cells within the second block through the cell-voltage-based charge transfers of flyback-type.

The switches 42a, 42b are used to switch between a charge-transfer-enabled mode and a charge-transfer-inhibited mode of the charge-transfer circuit 40, in the charge-transfer-enabled mode electric charge is allowed to be transferred from the first block to the second block by turning on or off each of the switches, and in the charge-transfer-inhibited mode electric charge is not allowed to be transferred from the first battery cell to the second battery cell by keeping the switches turned off.

As described above, in the present embodiment, both the so cell-voltage equalization circuit 31 and the charge-transfer circuit 40 may be of flyback type. For example, the coils 36 of the cell-voltage equalization circuit 31 and/or the coil 42c of the charge-transfer circuit 40 may be a chip inductor, where the chip inductor is provided outside the monitoring IC 30. Alternatively, the coils 36 and the coil 42c may be provided in the monitoring IC 30, where the number of times of voltage equalization is preferably increased by RF-controlling the switches 35, 42a, 42b.

(Fourth Embodiment)

There will now be explained the fourth embodiment of the present invention. For brevity, only differences from the first to third embodiments will be explained.

In the fourth embodiment, the cell-voltage equalization process may be performed through the block-voltage-based charge transfers of flyback type between different blocks 12 and the cell-voltage-based charge transfers of charge-pump type between different battery cells 11 within each block 12.

Figure 5:
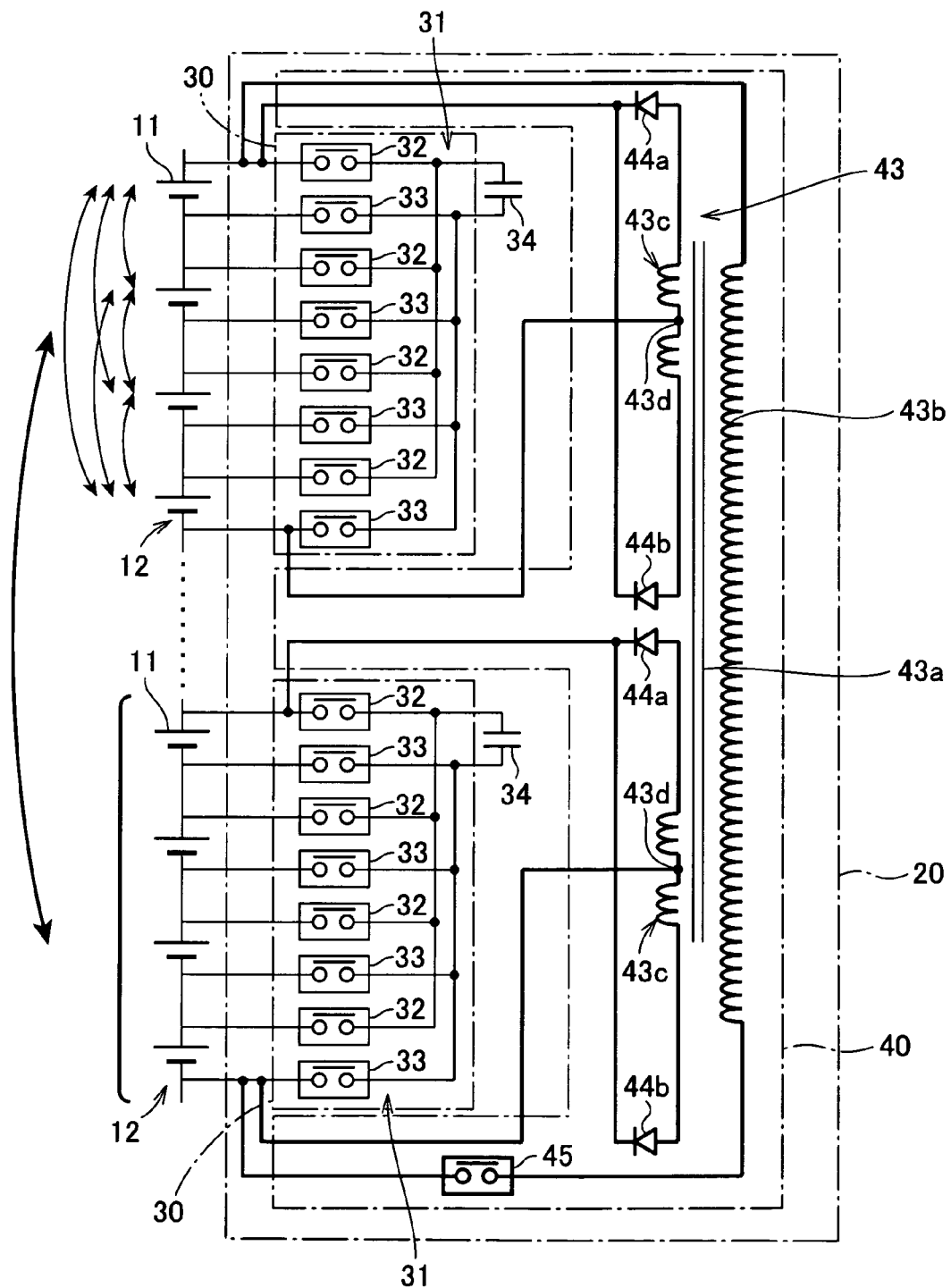
FIG. 5 is a block diagram of a battery voltage monitoring system including a battery voltage monitoring device in accordance with a fourth embodiment of the present invention.

FIG. 5 is a block diagram of a battery voltage monitoring system including a battery voltage monitoring device in accordance with the fourth embodiment of the present invention. For simplicity, the microcomputer 50 is not shown in FIG. 5. The cell-voltage equalization circuit 31 for each monitoring IC 30 may have the same configuration as in the first embodiment.

The charge-transfer circuit 40 of the present embodiment includes a transformer 43, diodes 44a, 44b, and a switch 45. The charge-transfer circuit 40 is configured to perform a block-voltage-based charge transfer between different blocks 12.

The transformer 43 includes an iron core 43a. One end of a primary winding 43b of the transformer 43 is connected to a negative terminal of a first battery cell 11 on the lowest voltage side that is in a first block 12 via the switch 45. The other end of the primary winding 43b of the transformer 43 is connected to a positive terminal of a second battery cell 11 on the highest voltage side that is in a second block 12. The second block 12 is on a higher voltage side than the first block 12.

One secondary winding 43c of the transformer 43 is provided for each block 12. One end of the secondary winding 43c is connected to an anode of the diode 44a, and a cathode of the diode 44a is connected to a positive terminal of the battery cell 11 on the highest voltage side within the block 12 associated with secondary winding 43c. On the other hand, the other end of the secondary winding 43e is connected to an anode of the diode 44b, and a cathode of the diode 44b is connected to the cathode of the diode 44a. In addition, a center tap 43d of the secondary winding 43c is connected to a negative terminal of the battery cell 11 on the lowest voltage side within the block 12 associated with secondary winding 43c.

With this configuration, when the microcomputer 50 turns on the switch 45 in the charge-transfer circuit 40, a loop circuit composed of the battery pack 10, the switch 45 and the primary winding 43b is formed, and then a primary current flows through the primary winding 43b, which leads to discharge from the battery pack 10 through the primary winding 43b. At the same time, a secondary current flows through the diode 44a, the block 12, and the center tap 43d as a function of the primary current, and magnetic energy is stored in the iron core 43a in the flyback operation of the transformer 43. This leads to a larger secondary current flowing through a block 12 which has a lower block voltage, and thus leads to the block-voltage equalization.

Subsequently, when the microcomputer 50 turns off the switch 45 in the charge-transfer circuit 40, the stored magnetic energy is released from the iron core 43a in the flyback operation of the transformer 43. At the same time, a charging current flows through the diode 44b, the block 12, and the center tap 43d. This so also leads to a larger secondary current flowing through a block 12 which has a lower block voltage, and thus leads to the block-voltage equalization. As described above, the switch 45 is used to switch between a charge-transfer-enabled mode and a charge-transfer-inhibited mode of the charge-transfer circuit 40. In the charge-transfer-enabled mode electric charge is allowed to be transferred from the first block to the second block by turning on or off the switch, and in the charge-transfer-inhibited mode electric charge is not allowed to be transferred from the first block to the second block by keeping the switch turned off.

As in the first embodiment, the cell voltages of the battery cells in each block 12 are to be equalized through the cell-voltage-based charge transfers between different cells.

As described above, the charge-transfer circuit 40 may be configured to perform the charge transfer of transformer-type between different blocks 12. In this configuration, a primary current flows through the primary winding 43b of the transformer 43, which is accompanied by discharge from the battery pack 10. Electric charge discharged from the battery pack 10 will then be allocated to the blocks 12 depending on the block voltages, which leads to the most efficient charge transferring process.

(Other Embodiments)

In each above exemplary embodiment, the battery voltage monitoring device 20 is mounted in an electrical vehicle such as a hybrid car. The present invention, however, is not limited to the above embodiments configured for use with electrical vehicles. In other embodiments, for example, the battery voltage monitoring device 20 may be configured to monitor battery cells of an electric storage device of home or factory installation type.

These and other modifications will be understood by those of ordinary skill in the art to be within the scope of the invention. For example, to achieve the voltage equalization, charge transfers between different battery cells 11 may be of flyback type, and charge transfers between different blocks 12 may be of charge-pump type. Other combinations may also be possible. Alternatively to the first embodiment where the charge-transfer circuit 40 is of charge-pump type, the charge-transfer circuit 40 may be of flyback or transformer type.

In each embodiment set forth above, since each block 12 includes four battery cells 11, the charge-transfer circuit 40 is configured to perform an inter-block charge transfer from a first battery cell 11 to a second battery cell 11 that is fourth or higher adjacent to the first battery cell 11. However, as described in the first embodiment, to achieve a charge transfer with an efficiency of 60% or more, it is desired that the charge-transfer circuit 40 should perform an inter-block charge transfer from a first battery cell 11 to a second battery cell 11 that is fifth or higher adjacent to the first battery cell 11.

In some embodiments where the battery pack 10 is simply composed of a plurality of battery cell 11 connected in series, the charge-transfer circuit 40 may be configured to perform a direct charge transfer from a first battery cell 11 to a second battery cell 11 that is second or higher adjacent to the first battery cell 11. Such a direct charge transfer bypassing intermediate battery cells between the first and second battery cells 11 leads to a more efficient charge transferring process.

What is claimed is:

1. A battery voltage monitoring device for equalizing cell voltages of a plurality of battery cells electrically connected in series, the plurality of battery cells being grouped into a plurality of blocks, the plurality of blocks being electrically connected in series and each having a same predetermined number of battery cells electrically connected in series, the device comprising:

cell-voltage detecting means for detecting cell voltages of the plurality of battery cells; and charge-transferring means for performing a direct charge transfer from a first specific battery cell to a second specific battery cell that is second or higher adjacent to the first specific battery cell and has a lower cell voltage than the first specific battery cell on the basis of the cell voltages of the battery cells detected by the cell-voltage detecting means, the first specific battery cell belonging to a first block of the plurality of blocks and the second specific battery cell belonging to a second block of the plurality of blocks that is first or higher adjacent to the first block.

2. The device of claim 1, further comprising:

cell-voltage equalizing means for each of the plurality of blocks, the cell-voltage equalizing means being adapted to perform charge transfers between battery cells belonging to the block so as to equalize cell voltages of the battery cells of the block;

control means for operating the cell-voltage equalizing means and the charge-transferring means to equalize cell voltages of the plurality of battery cells on the basis of the cell voltages of the battery cells detected by the cell-voltage detecting means so that a total number of charge transfers is minimized.

3. The device of claim 1, wherein the charge-transferring means comprises switching means for switching between a charge-transfer-enabled mode and a charge-transfer-inhibited mode such that in the charge-transfer-enabled mode electric charge is allowed to be transferred from the first specific battery cell to the second specific battery cell, and in the charge-transfer-inhibited mode electric charge is not allowed to be transferred from the first specific battery cell to the second specific battery cell.

4. The device of claim 1, wherein the second specific battery cell is fifth or higher adjacent to the first specific battery cell.

5. A battery voltage monitoring device for equalizing cell voltages of a plurality of battery cells electrically connected in series, the plurality of battery cells being grouped into a plurality of blocks, the plurality of blocks being electrically connected in series and each having a same predetermined number of battery cells electrically connected in series, the device comprising:

a cell-voltage detection circuit adapted to detect cell voltages of the plurality of battery cells; and a charge-transfer circuit adapted to perform a direct charge transfer from a first specific battery cell to a second specific battery cell that is second or higher adjacent to the first specific battery cell and has a lower cell voltage than the first battery cell on the basis of the cell voltages of the battery cells detected by the cell-voltage detection circuit, the first specific battery cell belonging to a first block of the plurality of blocks and the second specific battery cell belonging to a second block of the plurality of blocks that is first or higher adjacent to the first block.

6. The device of claim 5, further comprising:

a cell-voltage equalization circuit for each of the plurality of blocks, adapted to perform charge transfers between battery cells belonging to the block so as to equalize cell voltages of the battery cells of the block;

a control circuit adapted to operate the cell-voltage equalization circuit and the charge-transfer circuit to equalize cell voltages of the plurality of battery cells on the basis of the cell voltages of the battery cells detected by the cell-voltage detection circuit so that a total number of charge transfers is minimized.

7. The device of claim 5, wherein the charge-transfer circuit comprises one or more switches that are used to switch between a charge-transfer-enabled mode and a charge-transfer-inhibited mode of the charge-transfer circuit such that in the charge-transfer-enabled mode electric charge is allowed to be transferred from the first specific battery cell to the second specific battery cell by operatively turning on or off each of the switches, and in the charge-transfer-inhibited mode electric charge is not allowed to be transferred from the first specific battery cell to the second specific battery cell by keeping each of the switches turned off.

8. The device of claim 5, wherein the second specific battery cell is fifth or higher adjacent to the first specific battery cell.

9. The device of claim 5, wherein the charge-transfer circuit is of charge-pump type.

10. The device of claim 5, wherein the charge-transfer circuit is of flyback type.

11. The device of claim 5, wherein the charge-transfer circuit is of transformer type.

* * * * *